US011100686B2

(12) United States Patent
Yoo et al.

(10) Patent No.: US 11,100,686 B2
(45) Date of Patent: Aug. 24, 2021

(54) APPARATUS CONFIGURED TO RENDER OBJECT INCLUDING PATH, COMPUTING DEVICE INCLUDING THE APPARATUS, AND RENDERING METHOD OF THE APPARATUS

(71) Applicant: SAMSUNG ELECTRONICS CO., LTD., Suwon-si (KR)

(72) Inventors: Jeong-joon Yoo, Hwaseong-si (KR); Young-sam Shin, Hwaseong-si (KR); Dong-hoon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 16/576,353

(22) Filed: Sep. 19, 2019

(65) Prior Publication Data

US 2020/0193657 A1 Jun. 18, 2020

(30) Foreign Application Priority Data

Dec. 14, 2018 (KR) .......................... 10-2018-0162150

(51) Int. Cl.
*G06T 11/20* (2006.01)
*G06T 1/20* (2006.01)
*G06T 1/60* (2006.01)
*G06T 11/40* (2006.01)

(52) U.S. Cl.
CPC .............. *G06T 11/203* (2013.01); *G06T 1/20* (2013.01); *G06T 1/60* (2013.01); *G06T 11/40* (2013.01)

(58) Field of Classification Search
CPC . G06T 11/203; G06T 1/20; G06T 1/60; G06T 11/40

USPC .......................................................... 345/443
See application file for complete search history.

(56) References Cited

U.S. PATENT DOCUMENTS

| | | | |
|---|---|---|---|
| 7,408,553 B1 * | 8/2008 | Toksvig | G06T 11/40 345/423 |
| 8,072,452 B1 * | 12/2011 | Brown | G06T 17/20 345/419 |
| 9,449,421 B2 | 9/2016 | Kwon et al. | |
| 9,558,573 B2 | 1/2017 | Bolz et al. | |
| 9,892,534 B2 | 2/2018 | Yoo et al. | |
| 9,940,686 B2 | 4/2018 | Fernandez et al. | |
| 9,984,497 B2 | 5/2018 | Yoo et al. | |
| 2009/0046098 A1 * | 2/2009 | Barone | G06T 11/40 345/420 |

(Continued)

OTHER PUBLICATIONS

J. J. Yoo, J. Lee, K. Sundeep, W. Lee, B. John, S. Ryu, "Tile-based Path Rendering for Mobile Device", Proc. of ACM SIGGRAPH Asia, 2015.*

(Continued)

*Primary Examiner* — Jin Ge
(74) *Attorney, Agent, or Firm* — Sughrue Mion, PLLC

(57) ABSTRACT

An apparatus configured to render an object including a path includes a storage circuit, an arithmetic circuit configured to determine a direction of a plurality of primitives included in the path based on path data, generate primitive direction information, store the primitive direction information in the storage circuit, and generate a winding number of each of a plurality of pixels using the stored primitive direction information, and a determination circuit configured to determine whether a shading operation is to be performed based on the generated winding number.

19 Claims, 17 Drawing Sheets

(56) References Cited

U.S. PATENT DOCUMENTS

| | | | |
|---|---|---|---|
| 2011/0090228 A1* | 4/2011 | Persson | G06T 11/203 |
| | | | 345/443 |
| 2011/0285711 A1* | 11/2011 | Kilgard | G06T 15/005 |
| | | | 345/426 |
| 2014/0043330 A1* | 2/2014 | Ceylan | G06T 17/20 |
| | | | 345/423 |
| 2015/0310636 A1* | 10/2015 | Yoo | G06T 11/40 |
| | | | 345/593 |
| 2016/0042561 A1* | 2/2016 | Yoo | G06T 11/40 |
| | | | 345/426 |
| 2016/0275710 A1 | 9/2016 | Yoo et al. | |
| 2016/0307342 A1 | 10/2016 | Lee et al. | |
| 2017/0294043 A1* | 10/2017 | Yoo | G06T 17/005 |
| 2017/0365031 A1* | 12/2017 | Lee | G06T 11/40 |
| 2018/0144544 A1* | 5/2018 | Yoo | G06T 15/005 |
| 2018/0300946 A1* | 10/2018 | Yoo | G06T 15/80 |
| 2019/0080428 A1 | 3/2019 | Yoo et al. | |

OTHER PUBLICATIONS

R. Li, Q. Hou, K. Zhou, "Efficient GPU path rendering using scanline rasterization", Proc. ACM SIGGRAPH Asia Conf., pp. 1-12, 2016.*

* cited by examiner

__US 11,100,686 B2__

APPARATUS CONFIGURED TO RENDER OBJECT INCLUDING PATH, COMPUTING DEVICE INCLUDING THE APPARATUS, AND RENDERING METHOD OF THE APPARATUS

CROSS-REFERENCE TO RELATED APPLICATION

This application claims the benefit of Korean Patent Application No. 10-2018-0162150, filed on Dec. 14, 2018, in the Korean Intellectual Property Office, the disclosure of which is incorporated herein in its entirety by reference.

BACKGROUND

The inventive concept relates to an apparatus configured to perform graphics processing, and more particularly, to an apparatus configured to render an object including a path, a computing device including the apparatus, and a rendering method of the apparatus.

In recent years, research has been conducted into methods of improving the acceleration performance of an apparatus (or graphics processing apparatus) configured to perform graphics processing operations, such as a vector graphics operation or a path rendering operation. In particular, when a winding number of each pixel is generated in the path rendering operation, it is necessary to develop a method of minimizing a number of arithmetic operations and efficiently using a memory space of the apparatus during the arithmetic operations.

SUMMARY

The inventive concept provides an apparatus capable of reducing the number of arithmetic operations to generate a winding number and efficiently using a memory space of the apparatus during the arithmetic operations, a computing device including the apparatus, and a rendering method of the apparatus.

According to an aspect of the inventive concept, there is provided an apparatus configured to render an object including a path, the apparatus including: a storage circuit; an arithmetic circuit configured to: determine directions of a plurality of primitives in the path, based on path data, generate primitive direction information, control to store the primitive direction information in the storage circuit, and generate a winding number of each of a plurality of pixels using the stored primitive direction information; and a determination circuit configured to determine whether a shading operation is to be performed based on the generated winding number.

According to an aspect of the inventive concept, there is provided method of rendering an object including a path using a graphics processing apparatus, the method including: obtaining path data including information on vertexes in the path and a command corresponding to the path; generating primitive direction information indicating a direction of a plurality of primitives in the path, based on the path data; generating a winding number of each of a plurality of pixels using the primitive direction information; and determining whether a shading operation is to be performed based on the winding number.

According to another aspect of the inventive concept, there is provided a computing device including: a central processing unit (CPU) configured to generate path data corresponding to a predetermined path in a frame; a graphics processing unit (GPU) configured to receive the path data and perform a rendering operation based on the path data; and a GPU local memory configured to store a rendering program, wherein the rendering operation is performed by the GPU based on the rendering program, wherein the GPU includes a register file including a plurality of registers, and wherein the GPU is further configured to: determines a direction of a plurality of primitives in the path based on the path data, generate primitive direction information, control to store the primitive direction information in the register file, and generate a winding number of each of a plurality of pixels using the stored primitive direction information.

According to an aspect of the inventive concept, there is provided an apparatus configured to render an object including a path. The apparatus includes a storage circuit, an arithmetic circuit configured to check a direction of a plurality of primitives included in the path based on path data, generate primitive direction information, store the primitive direction information in the storage circuit, and generate a winding number of each of a plurality of pixels using the stored primitive direction information, and a determination circuit configured to determine whether a shading operation is to be performed based on the generated winding number.

According to another aspect of the inventive concept, there is provided a method of rendering an object including a path using a graphics processing apparatus. The method includes obtaining path data including information on vertexes included in the path and a command corresponding to the path, generating primitive direction information indicating a direction of a plurality of primitives included in the path based on the path data, generating a winding number of each of a plurality of pixels using the primitive direction information, and determining whether a shading operation is to be performed based on the winding number.

According to another aspect of the inventive concept, there is provided a computing device including a central processing unit (CPU) configured to generate path data corresponding to a predetermined path in a frame, a graphics processing unit (GPU) configured to receive the path data and perform a rendering operation based on the path data, and a GPU local memory configured to store a rendering program, wherein the rendering operation is performed by the GPU based on the rendering program. The GPU includes a register file including a plurality of registers. The GPU checks a direction of a plurality of primitives included in the path based on the path data, generates primitive direction information, stores the primitive direction information in the storage circuit, and generates a winding number of each of a plurality of pixels using the stored primitive direction information.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Exemplary embodiments will now be described more fully with reference to the accompanying drawings in which some exemplary embodiments are shown.

Figure 1:
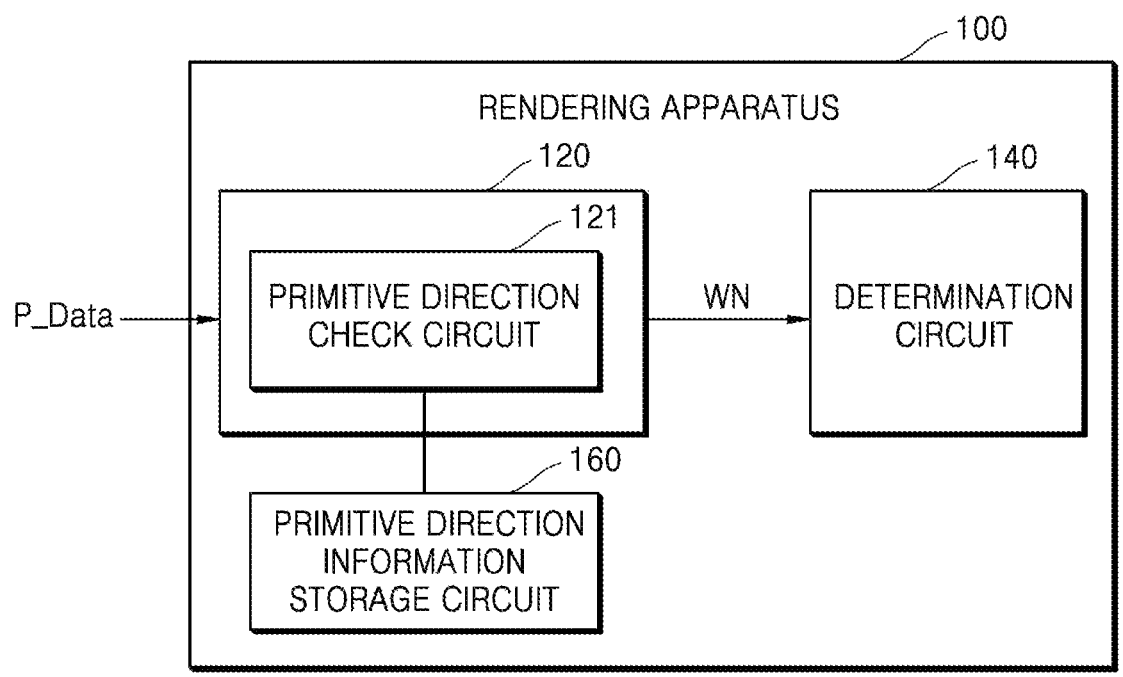
FIG. 1 is a block diagram of a rendering apparatus according to an exemplary embodiment.

FIG. 1 is a block diagram of a rendering apparatus 100 according to an exemplary embodiment.

Referring to FIG. 1, the rendering apparatus 100 may include an arithmetic circuit 120, a determination circuit 140, and a primitive direction information storage circuit 160. The rendering apparatus 100 may be referred to as a graphics processing apparatus. The arithmetic circuit 120 and the determination circuit 140 may correspond to one processor or a plurality of processors. The processor may be implemented as an array of a plurality of logic gates or implemented as a combination of a general-use microprocessor (MP) and a memory in which a program executable by the general-use MP is stored. Also, it will be understood by one of ordinary skill in the art that the process may be implemented as another type of hardware.

The arithmetic circuit 120 may receive path data P_Data. Hereinafter, a path may refer to a component of a target (e.g., an object) on which the rendering apparatus 100 performs a rendering operation. The rendering operation may refer to a process of converting two-dimensional (2D) or three-dimensional (3D) data described by numerical values and equations into a human-recognizable image. In the rendering operation, the path may be, for example, a straight line or curved line that extends from one point to another point. The object may include a closed polygon or closed path formed by connecting at least one path. The rendering apparatus 100 may divide a frame corresponding to the object in units of bounding boxes and perform a rendering operation on a plurality of pixels. Furthermore, the rendering apparatus 100 may divide the frame in units of tiles and perform a rendering operation on a plurality of pixels of each of the tiles. The path data P_Data may include information about coordinates of each of a plurality of vertexes included in the path and commands for combining the vertexes and constructing the path. For example, assuming that a straight line from a first pixel to a second pixel, from among pixels included in a frame, is a path, vertexes may refer to spots respectively corresponding to the first pixel and the second pixel. Accordingly, path data may refer to coordinates of a first vertex corresponding to the first pixel and a spot corresponding to the second pixel. Accordingly, the path data may include the coordinates of the first vertex corresponding to the first pixel, coordinates of a second vertex corresponding to the second pixel, and a command for constructing a straight line from the first vertex to the second vertex. Referring to the path data, not only information about the coordinates of the respective vertexes included in the path but also a position and traveling direction of the path and information about primitives may be comprehended. Also, the path data may further include information about a color value to be set for each pixel.

The arithmetic circuit 120 according to an exemplary embodiment may include a primitive direction check circuit 121 configured to minimize an amount of arithmetic operations when a winding number WN of each of a plurality of pixels for a rendering operation is generated. The primitive direction check circuit 121 may determine a direction of a plurality of primitives included in a path corresponding to path data P_Data based on the path data P_Data and generate primitive direction information. The primitive direction check circuit 121 may store the generated primitive direction information in the primitive direction information storage circuit 160 so that the primitive direction information may be used at any time when the arithmetic circuit 120 generates the winding number WN. In an exemplary embodiment, the primitive direction check circuit 121 may generate primitive direction information appropriate for a configuration of the primitive direction information storage circuit 160. Specifically, the primitive direction check circuit 121 may generate the primitive direction information in view of the configuration of the primitive direction information storage circuit 160. That is, the primitive direction information may have a bit number based on a storable bit number of a storage area of the primitive direction information storage circuit 160. The arithmetic circuit 120 may perform a pre-processing operation on the path data P_Data so that the primitive direction check circuit 121 may generate primitive direction information appropriate for the configuration of the primitive direction information storage circuit 160 as will be described in detail below with reference to a specific embodiment.

The primitive direction information storage circuit 160 may store not only the primitive direction data or arithmetic result data but also data for performing arithmetic operations included in the rendering operation or arithmetic result data. The primitive direction information storage circuit 160 may be referred to as a storage circuit. The primitive direction information storage circuit 160 may include a plurality of storage areas. For example, each of the storage areas may be implemented as a volatile memory, such as static random access memory (SRAM), dynamic random access memory (DRAM), a latch, a flip-flop, a register, and a special register having a multi-port, or a non-volatile memory, such as NAND flash memory, vertical NAND (VNAND) flash memory, NOR flash memory, resistive RAM (RRAM), phase-change RAM (PRAM), magnetoresistive RAM (MRAM), ferromagnetic RAM (FRAM), and spin-transfer torque-RAM (STT-RAM).

The arithmetic circuit 120 according to an exemplary embodiment may generate a winding number WN of each of a plurality of pixels using the primitive direction information. The arithmetic circuit 120 may read (or obtain) the primitive direction information from the primitive direction information storage circuit 160. However, in some exemplary embodiments, the arithmetic circuit 120 may directly use the primitive direction information generated by the primitive direction check circuit 121. A detailed description of the winding number WN will be presented below with reference to FIG. 3.

The arithmetic circuit 120 may provide the winding number WN generated in the above-described manner to the determination circuit 140. The arithmetic circuit 120 may manage at least one storage area of the primitive direction information storage circuit 160 in which the primitive direction information is stored, by using address information. Specifically, the arithmetic circuit 120 may control to store the primitive direction information in at least one storage area of the primitive direction information storage circuit 160. In addition, to ensure a space for generating a winding number for the next path data, the arithmetic circuit 120 may control to delete primitive direction information corresponding to the winding number WN provided to the determination circuit 140, from the primitive direction information storage circuit 160.

The determination circuit 140 may determine whether a color is to be assigned to a pixel based on the winding number WN. The determination circuit 140 according to an exemplary embodiment may perform a shading operation based on information about a color assignment rule and the winding number WN. The shading operation may be a process of setting a color of each of the pixels. However, the above-described shading operation may be only an example, and the inventive concept is not limited thereto. The shading operation may be a process of setting the brightness of each of the pixels or a process of giving a desired texture to each of the pixels.

To generate the winding number WN for a rendering operation, the rendering apparatus 100 according to an exemplary embodiment may determine a direction of primitives included in a path and primitive direction information, and then generate a winding number of each of a plurality of pixels using the primitive direction information, thereby minimizing the amount of arithmetic operations. Also, the primitive direction information may have a bit number considering the configuration of the primitive direction information storage circuit 160 of the rendering apparatus 100, e.g., based on a storable bit number of a storage area of the primitive direction information storage circuit 160. Thus, it may not be required to change the configuration of the primitive direction information storage circuit 160 and simultaneously, a memory may be efficiently used.

Figure 2:
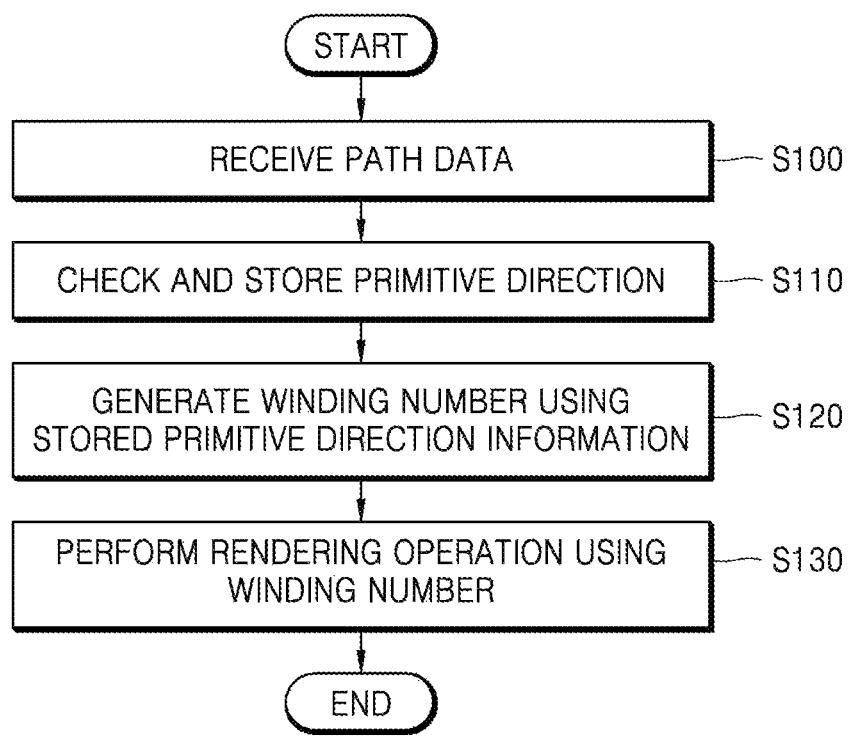
FIG. 2 is a flowchart of a path rendering method according to an exemplary embodiment.

FIG. 2 is a flowchart of a path rendering method according to an exemplary embodiment. Hereinafter, the flowchart of FIG. 2 will be described with reference to FIG. 1.

Referring to FIG. 2, the rendering apparatus 100 may receive path data P_Data from the outside (S100). The primitive direction check circuit 121 may determine a primitive direction based on the path data P_Data, generate a result of the determining as primitive direction information, and store the primitive direction information in the primitive direction information storage circuit 160 (S110). The arithmetic circuit 120 may generate a winding number WN using the primitive direction information stored in the primitive direction information storage circuit 160 (S120). The determination circuit 140 may perform a rendering operation on a plurality of pixels using the winding number WN (S130).

Figure 3:
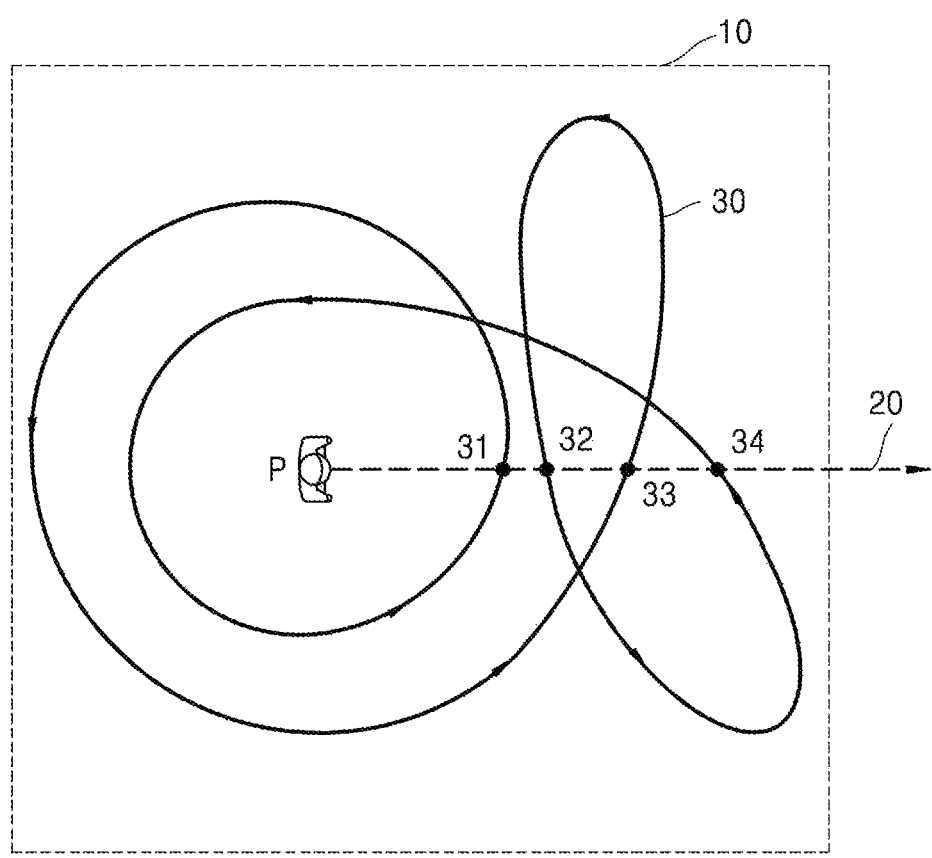
FIG. 3 is a diagram of a winding number described in an exemplary embodiment.

FIG. 3 is a diagram of a winding number described in an exemplary embodiment.

FIG. 3 illustrates an example for explaining a winding number corresponding to one pixel P of pixels included in a frame 10. In FIG. 3, for convenience of explanation, the pixel P is illustrated in the shape of a person watching in one direction.

Referring to FIG. 3, a path may be illustrated as a closed path along a periphery of the pixel P. When an imaginary line 20 is illustrated in a right horizontal direction from the pixel P, an imaginary half line 20 may intersect with the path 30 at four points, that is, first to fourth points 31, 32, 33, and 34. Accordingly, a winding number of the pixel P may be determined based on a direction in which the path is described from each of the first to fourth points 31, 32, 33, and 34. Hereinafter, an exemplary embodiment to which a method of generating winding numbers, which is different from that of the present embodiment, is applied will be described.

Specifically, a direction in which the path 30 is described from the first point 31 may correspond to a counterclockwise direction (described from bottom to top). Accordingly, a winding number of the pixel P may be primarily −1. Also, a direction in which the path 30 is described from the second point 32 may correspond to a clockwise direction (described from top to bottom). Accordingly, the winding number of the pixel P may be secondarily calculated as shown by '−1+1=0.' Also, a direction in which the path 30 is described from the third point 33 may correspond to a counterclockwise direction. Accordingly, the winding number of the pixel P may be tertiarily calculated as shown by '−1+1−1=−1.' Also, a direction in which the path 30 is described from the fourth point 34 may correspond to the counterclockwise direction. Accordingly, the winding number of the pixel P may be finally calculated as shown by '−1+1−1 −1=−2.' Although it is described above with reference to FIG. 3 that the winding number of the pixel P may be generated based on a path located on the right side of the pixel P, the inventive concept is not limited thereto. In other words, the winding number of the pixel P may be generated based on a path located on any one of a left side, a right side, an upper side, and a lower side of the pixel P.

To derive the same winding number '−1' of the pixel P described in FIG. 3, the arithmetic circuit 120 (FIG. 1) according to the embodiment may generate a primitive direction information and generate a winding number of the pixel P using the primitive direction information, thereby minimizing the amount of arithmetic operations.

Figure 4:
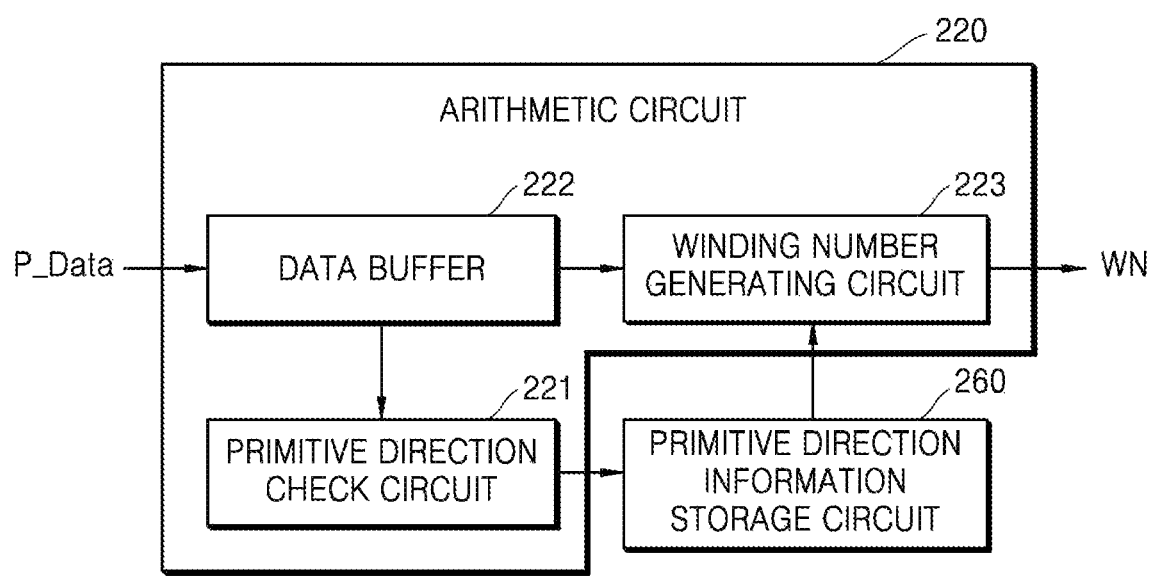
FIG. 4 is a block diagram of an arithmetic circuit according to an exemplary embodiment.

FIG. 4 is a block diagram of the arithmetic circuit 200, according to an exemplary embodiment.

Referring to FIG. 4, the arithmetic circuit 220 may include a primitive direction check circuit 221, a data buffer 222, and a winding number generating circuit 223. The data buffer 222 may receive path data P_Data from the outside and buffer the path data P_Data before the path data P_Data is transmitted to the primitive direction check circuit 221 and the winding number generating circuit 223. The primitive direction check circuit 221 may determine directions of a plurality of primitives included in a path based on the path data P_Data and generate primitive direction information. In an exemplary embodiment, the primitive direction information may include a plurality of bits, each of which may indicate a direction of each of the primitives.

Specifically, the primitive direction check circuit 221 may determine whether the primitives included in the path have a first direction, generate first data information based on a result of the determining whether the primitives included in the path have a first direction, determine whether the primitives have a second direction, and generate second data information based on the result of the determining whether the primitives have the second direction. The first direction may be a direction opposite the second direction. The primitive direction information may include the first data information and the second data information. In an exemplary embodiment, the primitive direction check circuit 221 may determine whether the primitives have an upper direction, generate the first data information, determine whether the primitives have a lower direction, and generate the second data information.

The primitive direction check circuit 221 may store the generated primitive direction information in a primitive direction information storage circuit 260. The primitive direction information storage circuit 260 may include at least one storage area, and the primitive direction check circuit 221 may store the primitive direction information in bit areas included in a storage area corresponding to each primitive, and specific exemplary embodiments thereof will be described in detail below.

The winding number generating circuit 223 may read primitive direction information from the primitive direction information storage circuit 260 and generate a winding number WN of each of a plurality of pixels using the primitive direction information. Specifically, the winding number generating circuit 223 may generate a primitive mask of each of the pixels depending on whether an imaginary line extending from each of the plurality of pixels in a third direction intersects with the primitives. In an exemplary embodiment, the third direction may be perpendicular to each of the first direction and the second direction. For example, when the first direction is an upper direction and the second direction is a lower direction, the third direction may be a right direction or a left direction.

The winding number generating circuit 223 may generate the winding number WN using the first data information and the second data information included in the primitive direction information and the primitive mask. In an example, the winding number generating circuit 223 may perform a first comparison operation between bits respectively corresponding to the primitive mask and the first data information, and perform a second comparison operation between bits respectively corresponding to the primitive mask and the second data information. Thereafter, the winding number generating circuit 223 may generate the winding number WN using a result of the first comparison operation and a result of the second comparison operation as will be described in detail below.

FIGS. 5A to 5D are diagrams for explaining a method of generating winding numbers, according to exemplary embodiments. Hereinafter, FIGS. 5A to 5D will be described with reference to FIG. 4. A method of generating winding numbers to which the inventive concept is applied will be described in an easily understandable manner, and exemplary embodiments of the inventive concept are not to be construed as limited thereto.

Figure 5A:
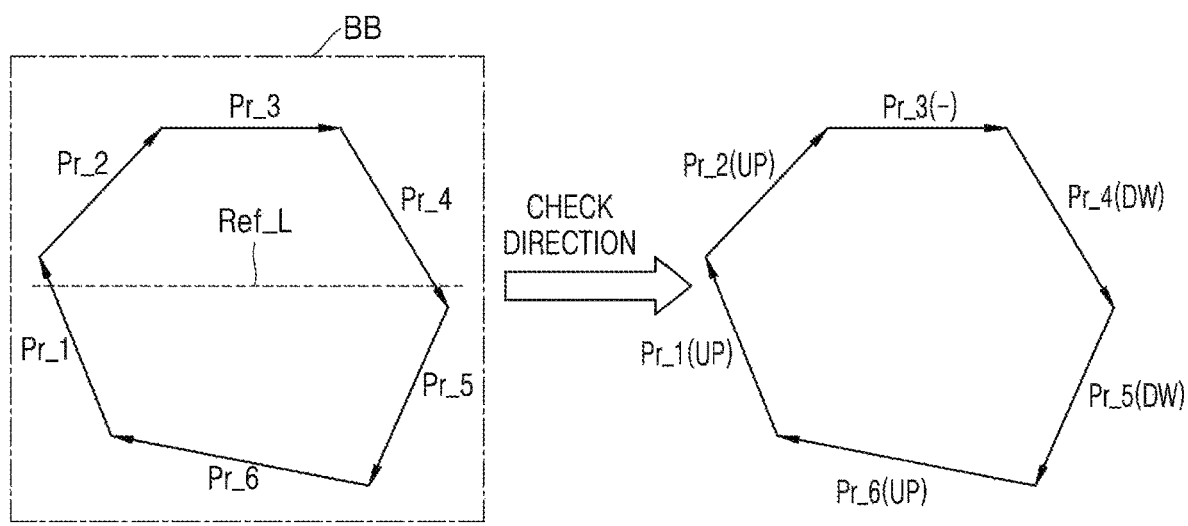
FIGS. 5A to 5D are diagrams for explaining a method of generating winding numbers, according to exemplary embodiments.

Referring to FIG. 5A, the primitive direction check circuit 221 may determine a direction of first to sixth primitives Pr_1 to Pr_6 included in a path included in a bounding box BB. The bounding box BB may be set on a frame using coordinate components of each of vertexes. For example, the rendering apparatus 100 of FIG. 1 may set the bounding box BB on the frame by using a maximum value and a minimum value of a horizontal coordinate component, from among coordinate components of vertexes corresponding to path data P_Data, and a maximum value and a minimum value of a vertical coordinate component of the coordinate components. In an exemplary embodiment, the primitive direction check circuit 221 may determine whether a traveling direction of each of the first to sixth primitives Pr_1 to Pr_6 is a lower direction DW or an upper direction UP using a reference line Ref_L. Based on the path data P_Data, the primitive direction check circuit 221 may determine the traveling direction of each of the fourth primitive Pr_4 and the fifth primitive Pr_5 to be the lower direction DW based on the path data P_Data and determine the traveling direction of each of the first primitive Pr_1, the second primitive Pr_2, and the sixth primitive Pr_6 to be the upper direction UP.

Figure 5B:
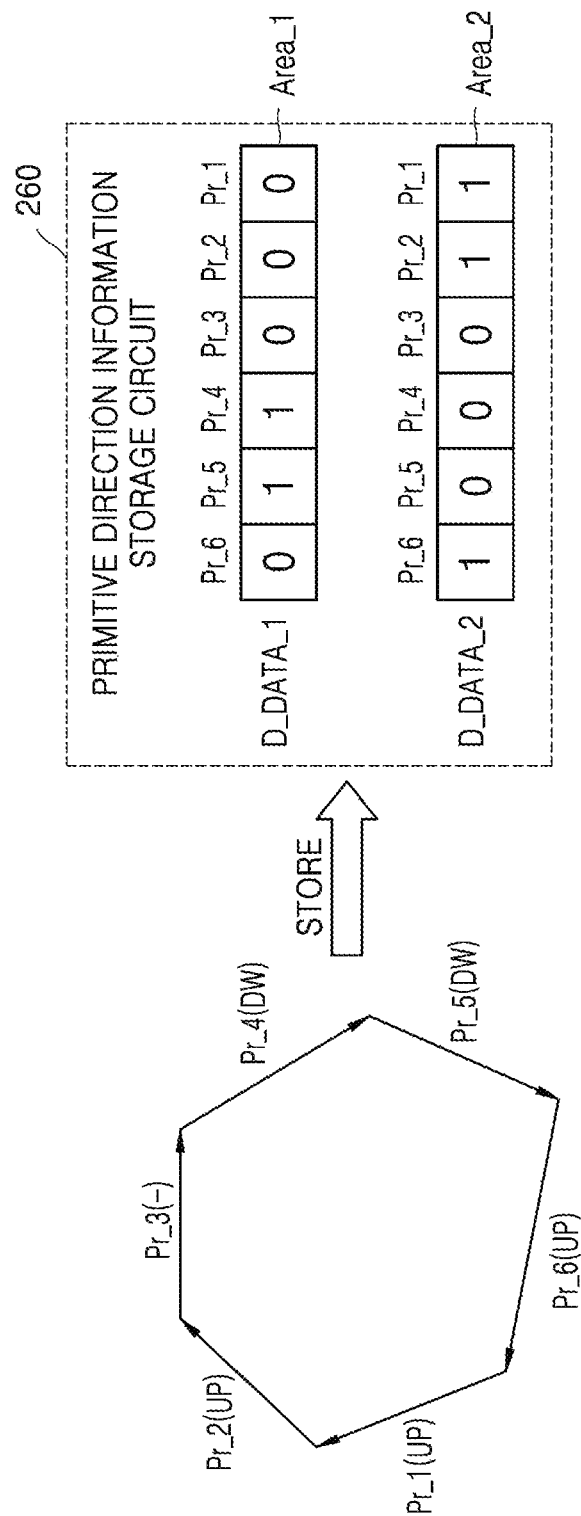

Referring further to FIG. 5B, the primitive direction check circuit 221 may generate first data information D_DATA_1 for indicating whether the traveling direction of each of the first to sixth primitives Pr_1 to Pr_6 matches the lower direction DW and second data information D_DATA_2 for indicating whether the traveling direction of each of the first to sixth primitives Pr_1 to Pr_6 matches the lower direction UP. The primitive direction check circuit 221 may respectively store the first data information D_DATA_1 and the second data information D_DATA_2 in a first storage area Area_1 and a second storage area Area_2 of the primitive direction information storage circuit 222. In an exemplary embodiment, the primitive direction check circuit 221 may set the first data information D_DATA_1 and the second data information D_DATA_2 to be stored in the first storage area Area_1 and the second storage area Area_2, respectively. Specifically, the primitive direction check circuit 221 may store the first data information D_DATA_1 in bit areas respectively corresponding to the first to sixth primitives Pr_1 to Pr_6 of the first storage area Area_1, and store the second data information D_DATA_2 in bit areas respectively corresponding to the first to sixth primitives Pr_1 to Pr_6 of the second storage area Area_2. In an exemplary embodiment, the first storage area Area_1 and the second storage area Area_2 may be implemented as respectively different registers or separately implemented in one register. However, the inventive concept is not limited to the embodiment, and the first storage area Area_1 and the second storage area Area_2 may be implemented as various memories.

The first data information D_DATA_1 may have a value '0 1 1 0 0 0,' which may indicate that the traveling direction of each of the fourth primitive Pr_4 and the fifth primitive Pr_5 matches the lower direction DW. The second data information D_DATA_2 may have a value '1 0 0 0 1 1,' which may indicate that the traveling direction of each of the first primitive Pr_1, the second primitive Pr_2, and the sixth primitive Pr_6 matches the upper direction UP.

Figure 5C:
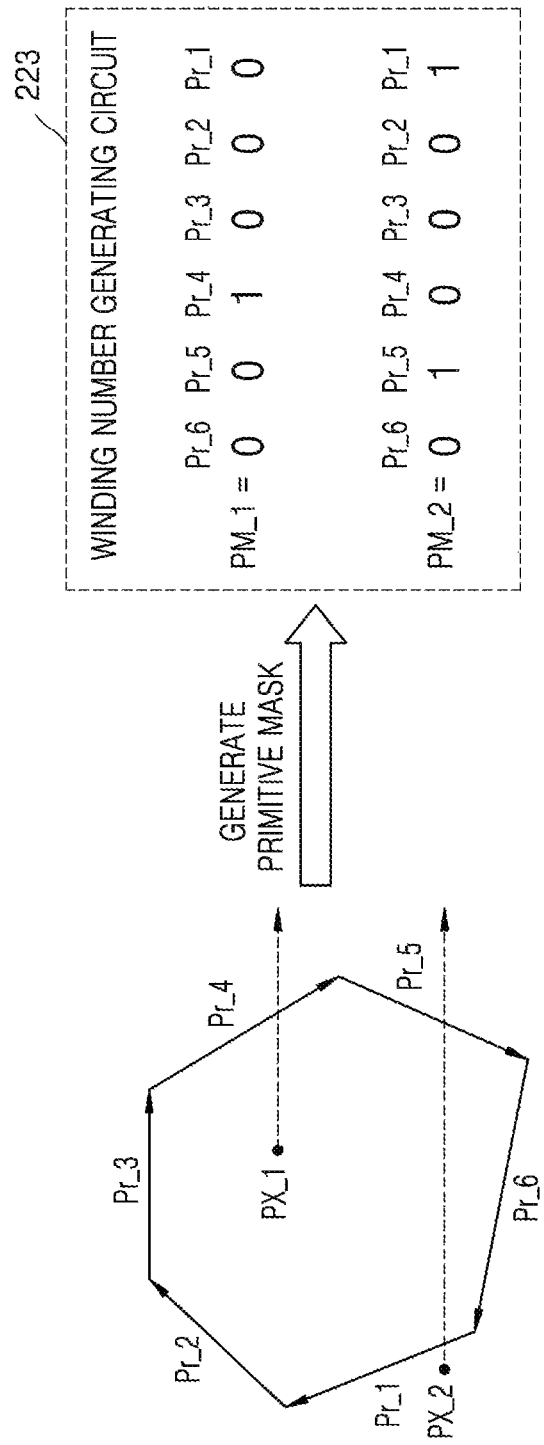

Referring to FIG. 5C, the winding number generating circuit 223 may generate first and second primitive masks PM_1 and PM_2 for a first pixel PX_1 and a second pixel PX_2 in parallel or sequentially with the primitive direction information generating operation of the primitive direction check circuit 221. Although an example of using two pixels (i.e., the first and second pixels PX_1 and PX_2) is taken below for brevity, the inventive concept is not limited thereto. Primitive masks for three or more pixels may be generated, and winding numbers of the three or more pixels may be generated.

In an exemplary embodiment, the winding number generating circuit 223 may set a bit corresponding to a primitive, which is viewed by specific pixels (e.g., the first and second pixels PX_1 and PX_2) in one direction (e.g., a right direction), as '1,' set a bit corresponding to a primitive, which is not viewed by the first and second pixels PX_1 and PX_2 in the one direction, as '0,' and generate the first and second primitive masks PM_1 and PM2. The one direction may be perpendicular to each of the lower direction DW and the upper direction UP of FIG. 5A. However, the above-described embodiment is only an example, and the inventive concept is not limited thereto. In another embodiment, the winding number generating circuit 223 may set a bit corresponding to a primitive, which is viewed by the first and second pixels PX_1 and PX_2 in one direction, as '0,' set a bit corresponding to a primitive, which is not viewed by the first and second pixels PX_1 and PX_2 in the one direction, as '1,' and generate the first and second primitive masks PM_1 and PM2.

Thus, the winding number generating circuit 223 may generate the first primitive mask PM_1 for a first pixel PX_1 having a value '0 0 1 0 0 0,' and generate the second primitive mask PM_2 for a second pixel PX_2 having a value '0 1 0 0 0 1.' The winding number generating circuit 223 may perform the operation of generating the first primitive mask PM_1 and the operation of generating the second primitive mask PM_2 in parallel.

Figure 5D:
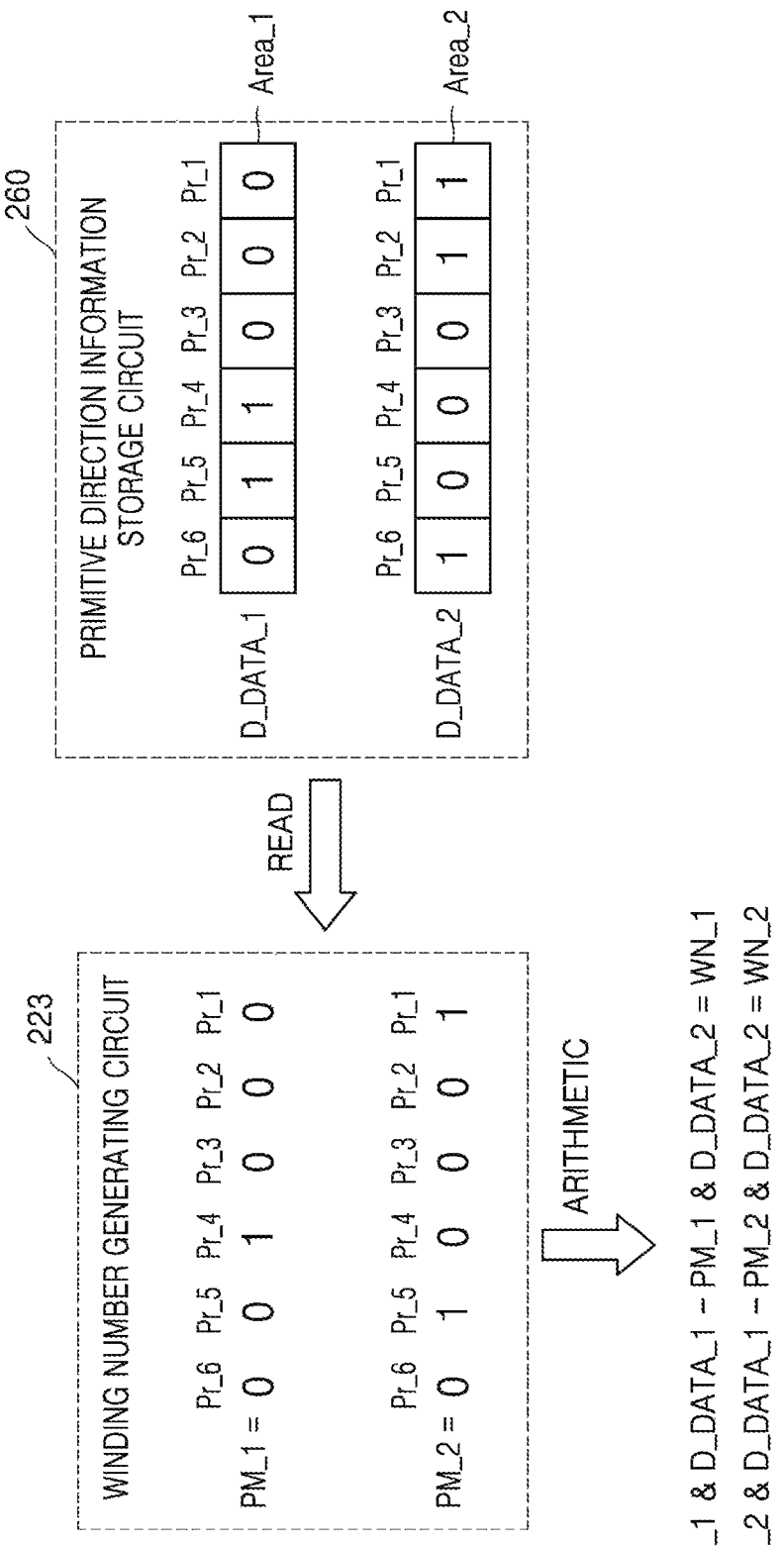

Referring to FIG. 5D, the winding number generating circuit 223 may read the first data information D_DATA_1 and the second data information D_DATA_2 from the primitive direction information storage circuit 260 and generate respective winding numbers WN_1 and WN_2 of the first and second pixels PX_1 and PX_2 by using the first data information D_DATA_1, the second data information D_DATA_2, and the first and second primitive masks PM_1 and PM_2.

In an exemplary embodiment, to generate a first winding number WN_1 of the first pixel PX_1, the winding number generating circuit 223 may perform a first comparison operation between bits respectively corresponding to the first primitive mask PM_1 and the first data information D_DATA_1 and perform a second comparison operation between bits respectively corresponding to the first primitive mask PM_1 and the second data information D_DATA_2. Thereafter, the winding number generating circuit 223 may generate the first winding number WN_1 using results of the first and second comparison results. To generate the second winding number WN_2 of the second pixel PX_2, the winding number generating circuit 223 may perform a first comparison operation between bits respectively corresponding to the second primitive mask PM_2 and the first data information D_DATA_1 and perform a second comparison operation between bits respectively corresponding to the second primitive mask PM_2 and the second data information D_DATA_2. Subsequently, the winding number generating circuit 223 may generate the second winding number WN_2 using results of the first and second comparison operations. The winding number generating circuit 223 may perform the operation of generating the first winding number WN_1 and the operation of generating the second winding number WN_2 in parallel.

In an example, the first and second comparison operations performed by the winding number generating circuit 223 may be 'and' operations, and the first and second winding numbers WN_1 and WN_2 may be generated using a difference between the results of the first and second comparison operations. As a result, the winding number generating circuit 223 may generate a first winding number WN_1 having a value '1' and a second winding number WN_2 having a value '0.'

Figure 6:
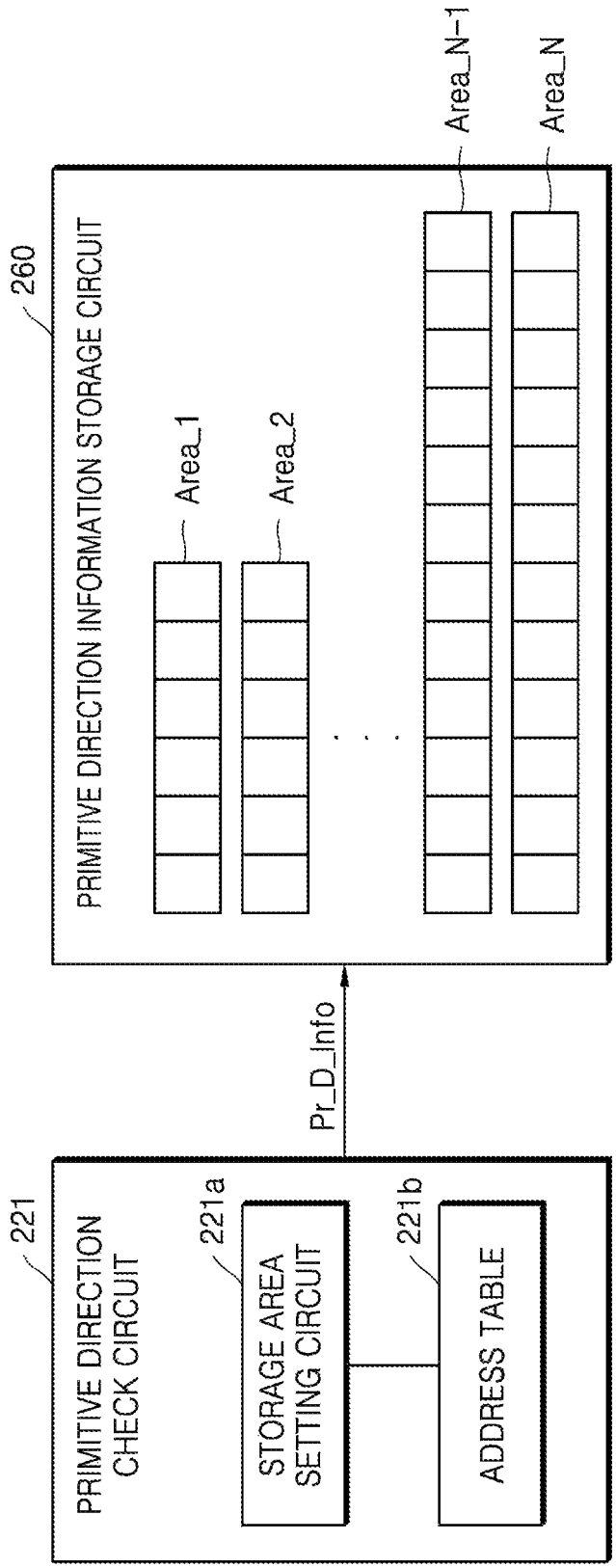
FIG. 6 is a block diagram of a method of storing primitive direction information of a primitive direction check circuit according to an exemplary embodiment.

FIG. 6 is a block diagram of a method of storing primitive direction information of the primitive direction check circuit 221 according to an exemplary embodiment.

Referring to FIG. 6, the primitive direction check circuit 221 may include a storage area setting circuit 221a and an address table 221b, and the primitive direction information storage circuit 260 may include a plurality of storage areas Area_1 to Area_N. The primitive direction check circuit 221 may set storage areas for primitive direction information Pr_D_Info based on a configuration of the primitive direction information storage circuit 260. In an exemplary embodiment, the storage areas are set in advance. In an example, the storage area setting circuit 221a may set storage areas capable of storing at least a bit number of the primitive direction information Pr_D_Info corresponding to the number of primitives included in a predetermined path, from among the storage areas Area_1 to Area_N, as areas for storing the primitive direction information Pr_D_Info. In an example, when each piece of first data information and second data information included in the primitive direction information Pr_D_Info includes '6' bits or less, the storage area setting circuit 221a may set a first storage area Area_1 and a second storage area Area_2 as areas for storing the primitive direction information Pr_D_Info. In another example, when each piece of the first data information and the second data information included in the primitive direction information Pr_D_Info is more than '6' bits and equal to or less than '12' bits, the storage area setting circuit 221a may set an N–1-th storage area Area_N–1 and an N-th storage area Area_N as areas for storing the primitive direction information Pr_D_Info. However, the inventive concept is not limited to the examples. Even when each piece of the first data information and the second data information included in the primitive direction information Pr_D_Info includes '6' bits or less, the storage area setting circuit 221a may set the N-th storage area Area_N as an area for storing the primitive direction information Pr_D_Info, and areas for storing both the first data information and the second data information may set in the N-th storage area Area_N by dividing the N-th storage area Area_N.

The storage area setting circuit 221a may arrange storage area setting information by using the address table 221b. Also, the address table 221b may include address information indicating a storage area of the primitive direction information storage circuit 260 in which the primitive direction information Pr_D_Info is stored. The winding number generating circuit 223 (FIG. 4) may read primitive direction information Pr_D_Info for generating winding numbers with reference to the address table 221b, from the primitive direction information storage circuit 260.

Although FIG. 6 illustrates an example in which the primitive direction information storage circuit 260 includes the storage areas Area_1 to Area_N having different storable bit numbers, the inventive concept is not limited thereto. In various other exemplary embodiments, the primitive direction information storage circuit 260 may include storage areas all having the same storable bit number or include only one storage area having a predetermined storable bit number.

Figure 7:
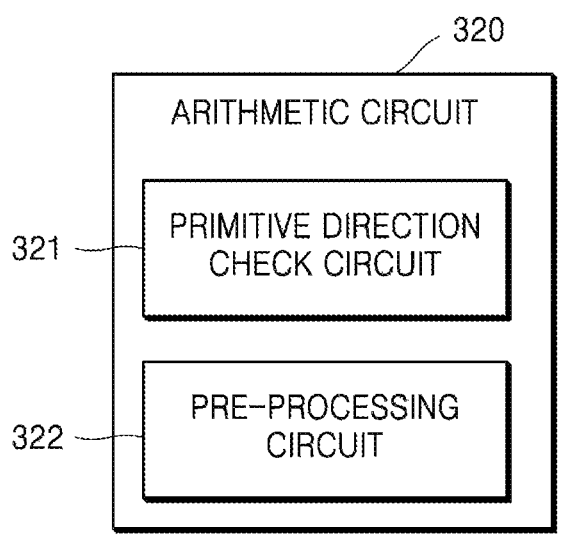
FIG. 7 is a block diagram of a pre-processing operation of an arithmetic circuit according to an exemplary embodiment.

FIG. 7 is a block diagram of a pre-processing operation of an arithmetic circuit 320 according to an exemplary embodiment.

Referring to FIG. 7, the arithmetic circuit 320 may include the primitive direction check circuit 321 and a pre-processing circuit 322. Since a detailed description of the primitive direction check circuit 321 is presented above, the pre-processing circuit 322 will mainly be described below.

The pre-processing circuit 322 according to an exemplary embodiment may determine whether the number of primitives included in a path exceeds N, based on path data, when a storage area of a primitive direction information storage circuit configured to store primitive direction information is capable of storing N bits. The pre-processing circuit 322 may perform a pre-processing operation on the path data to adjust the number of primitives to N or less based on the determination result.

Figure 8:
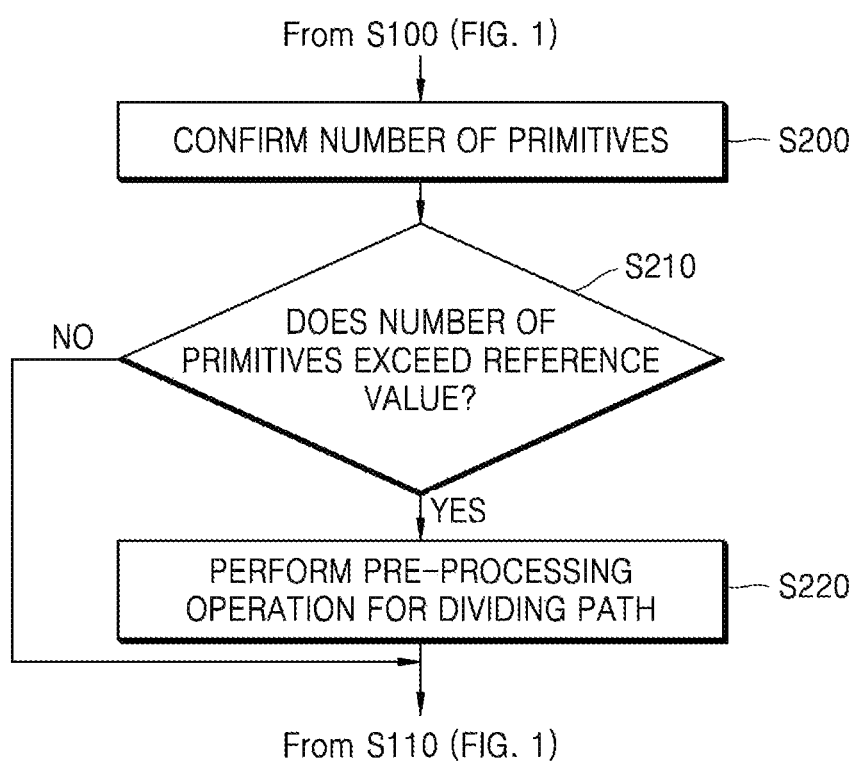
FIG. 8 is a flowchart of a pre-processing operation on path data according to an exemplary embodiment.

FIG. 8 is a flowchart of a pre-processing operation on path data according to an exemplary embodiment. Hereinafter, the flowchart of FIG. 8 will be described with reference to FIG. 7.

Referring to FIG. 8, after operation S100 (FIG. 2), the pre-processing circuit 322 may determine the number of primitives included in a predetermined path based on path data (S200). The pre-processing circuit 322 may determine whether the number of primitives exceeds a reference value (S210). The reference value may be set according to a configuration of a storage circuit in which primitive direction information is stored. That is, the reference value may be determined based on a storable bit number of a storage area of the storage circuit. For example, when the storable bit number of the storage area is N, the reference value may be set to N.

When operation S210 results in a Yes, the pre-processing circuit 322 may perform a pre-processing operation for dividing a path so that the number of primitives may be adjusted to the reference value or less (S220). When operation S210 results in a No, operation S110 (FIG. 1) may be performed.

Figure 9A:
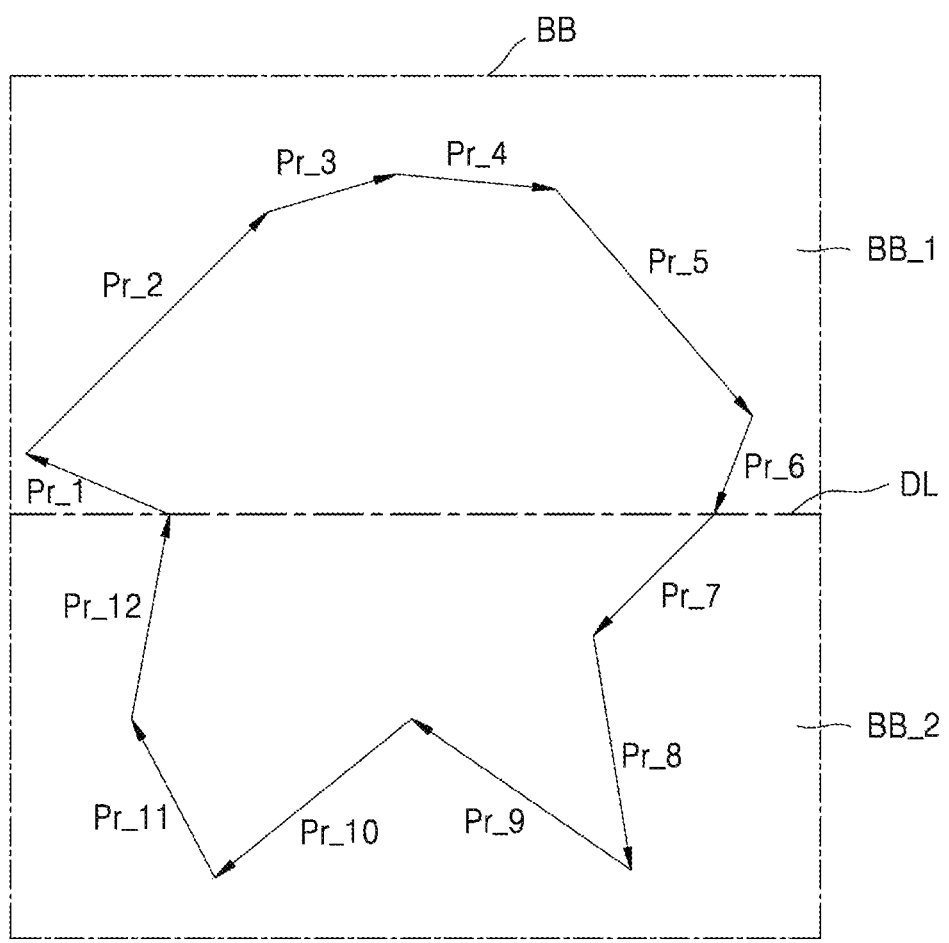
FIGS. 9A and 9B are diagrams of a pre-processing operation according to exemplary embodiments.
Figure 9B:
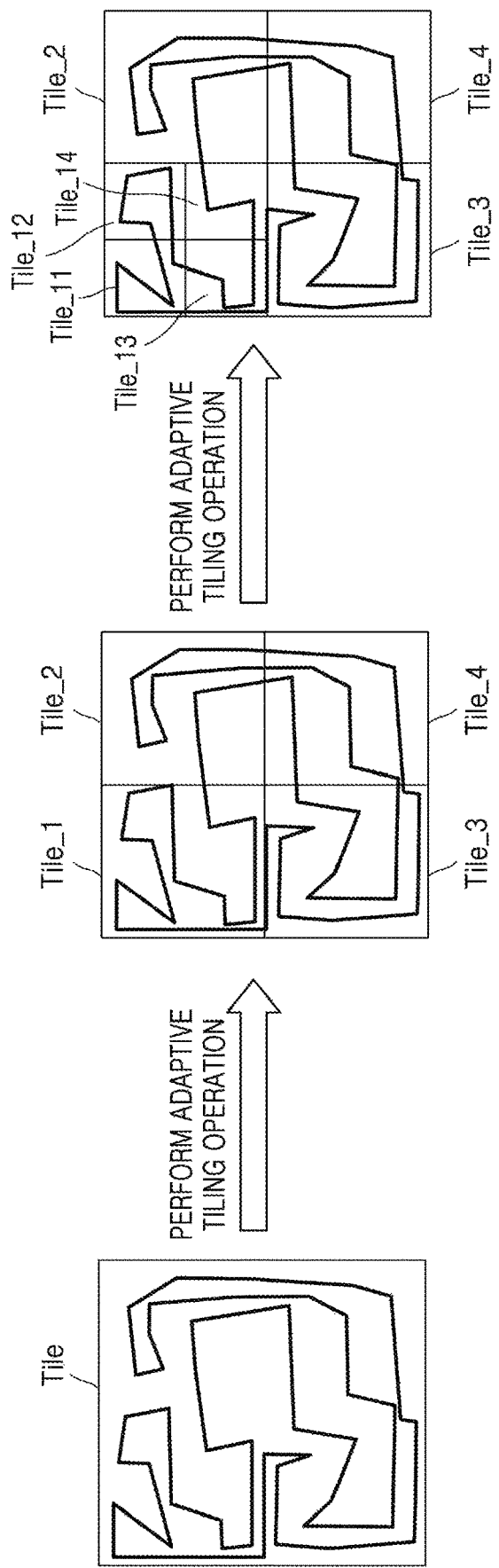

FIGS. 9A and 9B are diagrams of a pre-processing operation according to exemplary embodiments. FIGS. 9A and 9B will be described below with reference to FIG. 7. Hereinafter, it will be assumed that the number of primitives (or the reference value of FIG. 8) appropriate for a configuration of a storage circuit in which primitive direction information is stored is 6, and a path in a bounding block BB includes first to twelfth primitives Pr_1 to Pr_12.

Referring to FIG. 9A, since the number of primitives is presently 12 in the bounding block BB, a pre-processing circuit 322 may perform a pre-processing operation on path data and divide the bounding block BB into a first sub-bounding block BB_1 and a second sub-bounding block BB_2. A sub-path included in the first sub-bounding block BB_1 may include first to sixth primitives Pr_1 to Pr_6, and a sub-path included in the second sub-bounding block BB_2 may include seventh to twelfth primitives Pr_7 to Pr_12.

A rendering apparatus (or a graphics processing apparatus) may perform a rendering operation in units of sub-bounding blocks (e.g., BB_1 and BB_2). That is, the primitive direction check circuit 321 may generate primitive direction information in the units of sub-bounding blocks (e.g., BB_1 and BB_2), and the generated primitive direction information may be properly stored in the storage circuit.

It is assumed that a rendering apparatus (or a graphics processing apparatus) of FIG. 9B performs a tile-based path rendering operation. That is, the rendering apparatus (or the graphics processing apparatus) may divide the entire frame or a portion of the frame into consecutive small-sized tiles and perform a rendering operation. For example, a tile may include 32×32 pixels.

Referring to FIG. 9B, when the number of primitives in a tile exceeds a reference value (FIG. 8), the pre-processing circuit 322 may perform an adaptive tiling operation on the tile and divide the tile into a plurality of sub-tiles Tile_1 to Tile_4. Furthermore, when the number of primitives in the sub-tiles Tile_1 to Tile_4 still exceeds the reference value (FIG. 8), the pre-processing circuit 322 may perform an adaptive tiling operation on the corresponding sub-tile Tile_1 and divide the sub-tile Tile_1 into other sub-tiles Tile 11 to Tile 14.

As described above, the rendering apparatus (or the graphics processing apparatus) may perform a tile-based rendering operation using the divided sub-tiles Tile_1 to Tile_4 including primitives provided in a number equal to or smaller than the reference value (FIG. 8).

FIGS. 10A to 10D are diagrams of examples in which a rendering apparatus according to an exemplary embodiment selects different sides and calculates winding numbers of pixels.

Figure 10B:
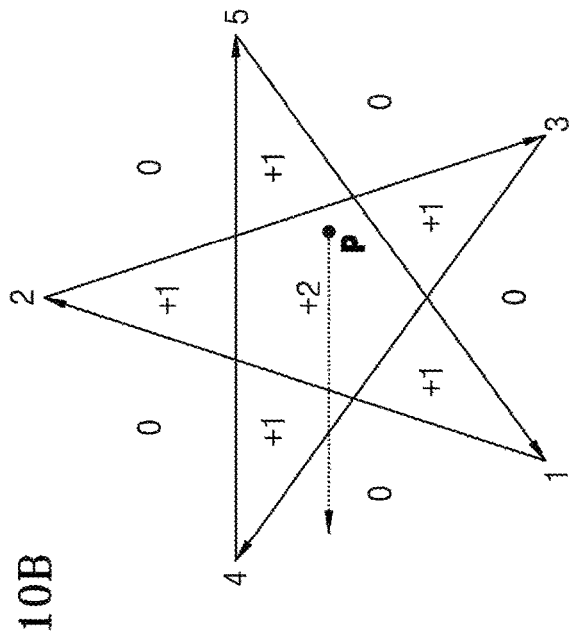
FIGS. 10A to 10D are diagrams of examples in which a rendering apparatus according to an exemplary embodiment selects different sides and calculates winding numbers of pixels.
Figure 10D:
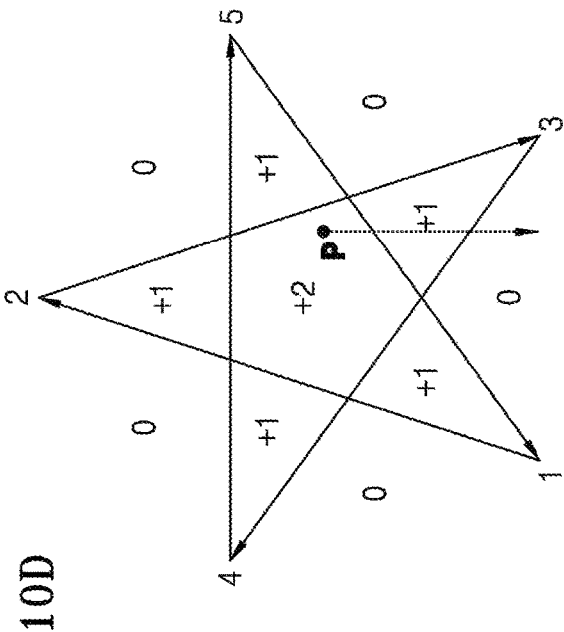
Figure 10A:
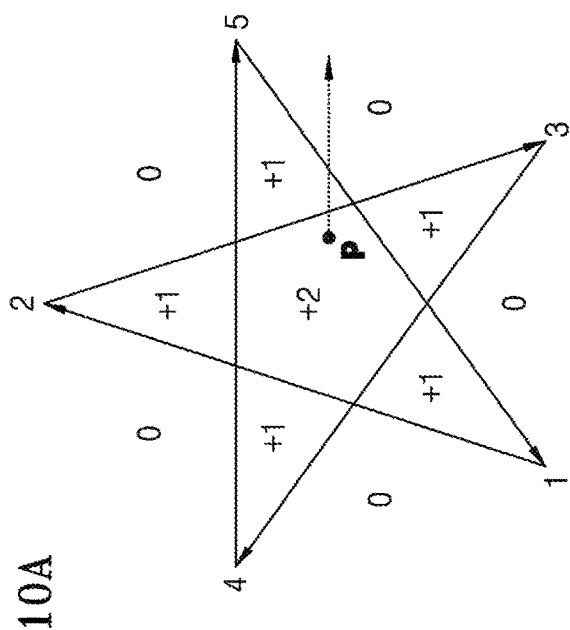

FIGS. 10A to 10D illustrate objects including vertexes 1 to 5. The same object having a star-like closed polygonal shape is illustrated in FIGS. 10A to 10D. Referring to FIG. 10A, the rendering apparatus according to the embodiment may determine a direction of a primitive including the vertexes 1 to 5 and generate primitive direction information. Also, the rendering apparatus may determine whether a path is located on a right side of a pixel P (e.g., a position on an imaginary half line from the pixel P in a right horizontal direction) and generate a primitive mask. The rendering apparatus may obtain a value '+2' as a winding number of the pixel P.

Referring to FIG. 10B, the rendering apparatus according to the embodiment may determine a direction of a primitive including vertexes 1 to 5 and generate primitive direction information. Also, the rendering apparatus may determine whether a path is located on a left side of a pixel P (e.g., a position on an imaginary half line from the pixel P in a left horizontal direction) and generate a primitive mask. The rendering apparatus may obtain a value '+2' as a winding number of the pixel P.

Figure 10C:
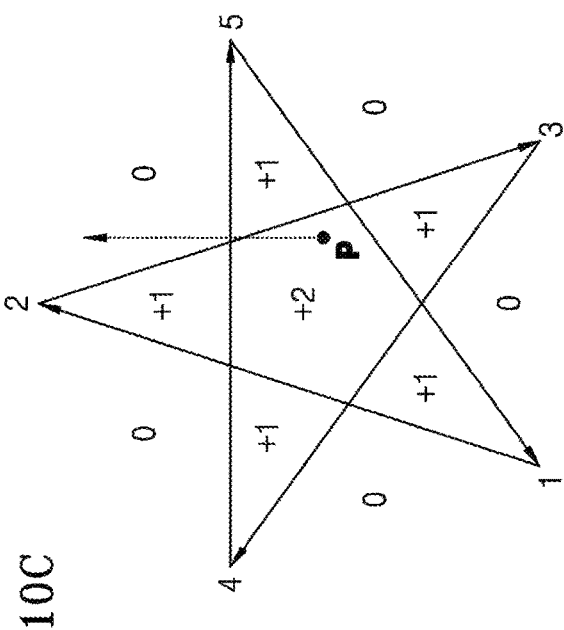

Referring to FIG. 10C, the rendering apparatus according to the embodiment may determine a direction of a primitive including vertexes 1 to 5 and generate primitive direction information. Also, the rendering apparatus may determine whether a path is located on an upper side of a pixel P (e.g., a position on an imaginary half line from the pixel P in an upper horizontal direction) and generate a primitive mask. The rendering apparatus may obtain a value '+2' as a winding number of the pixel P.

Referring to FIG. 10D, the rendering apparatus according to the embodiment may determine a direction of a primitive including vertexes 1 to 5 and generate primitive direction information. The rendering apparatus may determine whether a path is located on a lower side of a pixel P (e.g., a position on an imaginary half line from the pixel P in a lower horizontal direction) and generate a primitive mask. The rendering apparatus may obtain a value '+2' as a winding number of the pixel P.

As described above, even if any side of the pixel P is selected by the rendering apparatus to calculate the winding number of the pixel P, the same result may be obtained. Also, as shown in 10A to 10D, all the pixels P in the same area, from among areas divided by the path, may have the same winding number.

Figure 11:
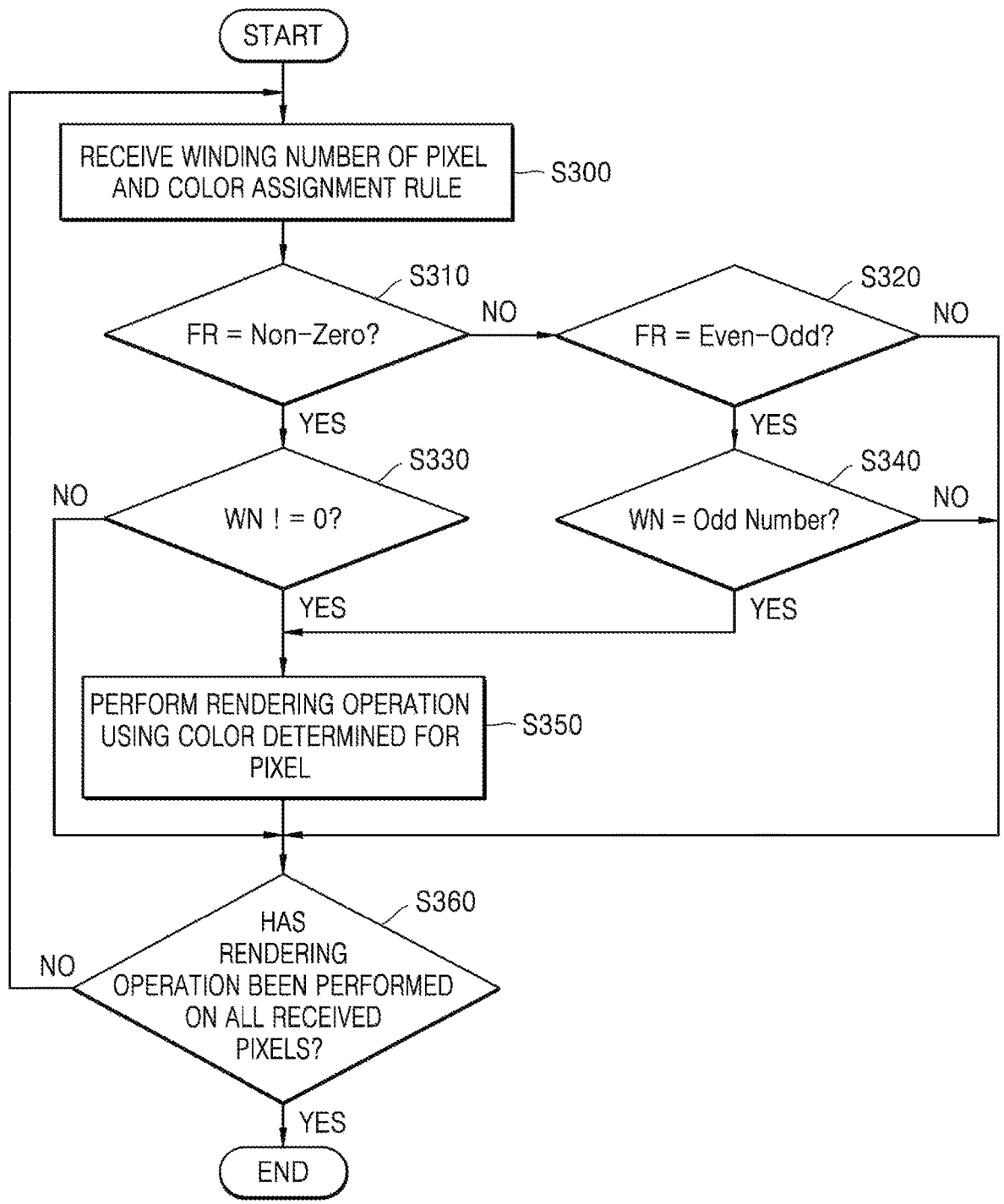
FIG. 11 is a flowchart of a rendering operation according to an exemplary embodiment.

FIG. 11 is a flowchart of a rendering operation according to an exemplary embodiment. Specifically, FIG. 11 is a flowchart of a method of operating the determination circuit 140 (FIG. 1).

Referring to FIG. 11, the determination circuit 140 may receive a winding number WN of a pixel and a color assignment rule FR (S300). The determination circuit 140 may determine whether the color assignment rule FR is a non-zero winding rule Non-Zero (S310). When the color assignment rule FR is the non-zero winding rule Non-Zero, the winding number WN of the pixel is checked to see if it is '0' (S330). When the winding number WN of the pixel is not '0' (S330, Yes), the determination circuit 140 may perform a rendering operation using a color determined for the pixel (S350). In an example, the determination circuit 140 may further receive information about a color determined by an external device (e.g., a central processing unit (CPU)) and perform the rendering operation using the determined color. When the winding number WN of the pixel is '0' (S330, No), the determination circuit 140 may skip the rendering operation using the color determined for the pixel (S350) and may perform a rendering operation on the next pixel by determining whether the rendering operation has been performed on all received pixels (S360).

When the color assignment rule FR is not the non-zero winding rule Non-Zero, the determination circuit 140 may determine whether the color assignment rule FR is an even-odd rule Even-Odd (S320). When the color assignment rule FR is the even-odd rule Even-Odd, the winding number WN of the pixel is checked to see if it is an odd number (S340). In an example, the determination circuit 140 may determine whether the winding number WN of the pixel is the odd number by checking whether a remainder of the winding number WN divided by 2 is 1 or not. When the winding number WN of the pixel is the odd number (S340, Yes), the determination circuit 140 may perform a rendering operation using a color determined for the pixel (S350). When the winding number WN of the pixel is not the odd number (S340, No), that is, when the winding number WN of the pixel is the even number, the determination circuit 140 may skip the rendering operation using the color determined for the pixel (S350) and may perform a rendering operation on the next pixel by determining whether the rendering operation has been performed on all received pixels (S360).

The determination circuit 140 may determine whether the rending operation has been performed on all received pixels corresponding to winding numbers (S360). When the rendering operation has not been performed on all the received pixels, the determination circuit 140 may perform a rendering operation by repeating operations S310 to S350. When the rendering operation has been performed on all the received pixels, the determination circuit 140 may end the rendering operation.

Figure 12:
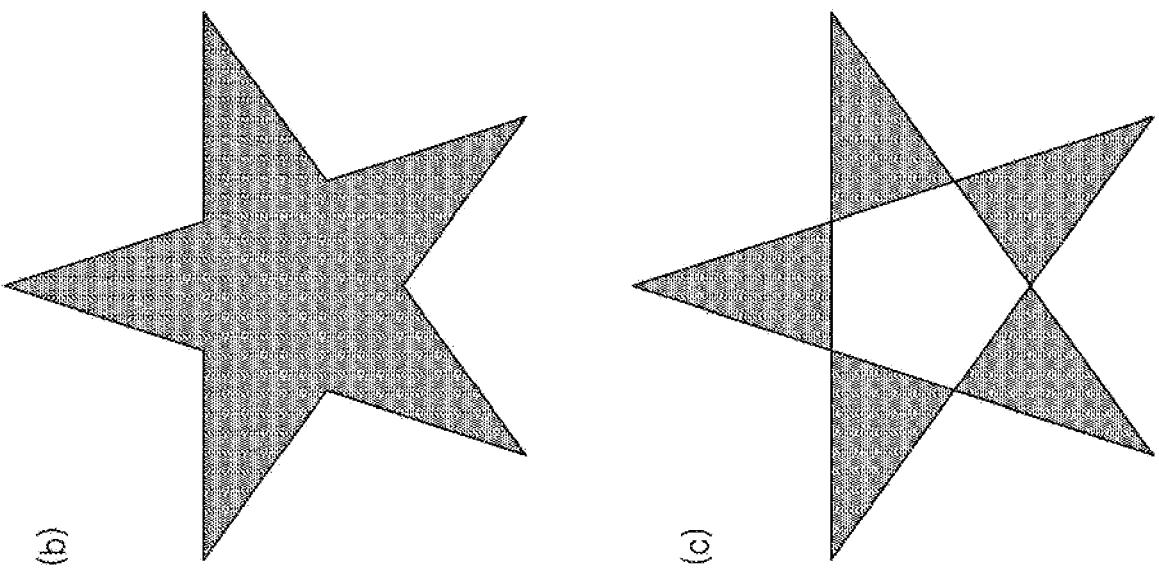
FIG. 12 is a diagram for explaining an example in which a determination circuit according to an exemplary embodiment determines whether to set a color on each of pixels.
Figure 12:
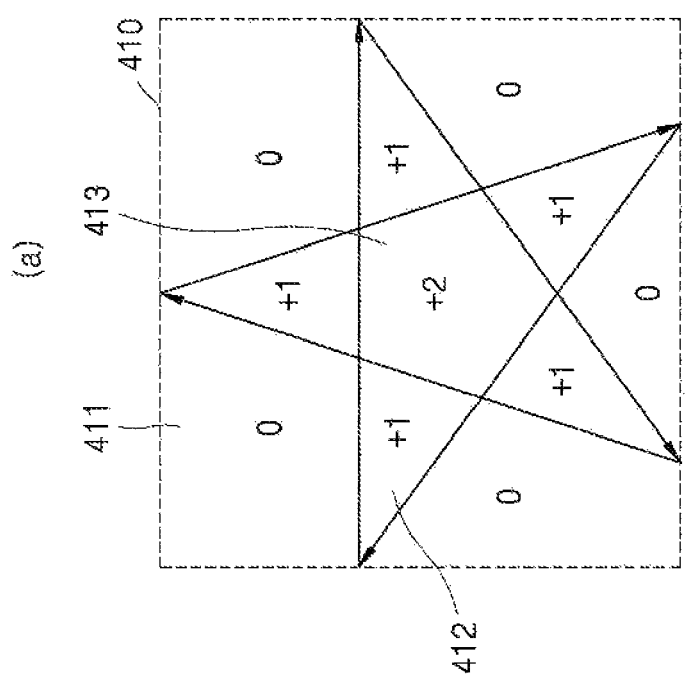

FIG. 12 is a diagram for explaining an example in which the determination circuit 140 (FIG. 1) according to an exemplary embodiment determines whether to set a color on each of pixels.

In FIG. 12, (a) illustrates results obtained by calculating a winding number WN of each of pixels included in a frame 410 using the arithmetic circuit 120 (FIG. 1) according to an exemplary embodiment. (b) illustrates results obtained by assigning color values to the respective pixels according to a non-zero winding rule. Also, (c) illustrates results obtained by assigning color values to the respective pixels according to an even-odd rule.

As shown in (a) of FIG. 12, the winding number WN of each of the pixels included in the frame 410 may be calculated. Specifically, a winding number WN of each of pixels included in a first area 411 may be calculated to be 0, a winding number WN of each of pixels included in a second area 412 may be calculated to be +1, and a winding number WN of each of pixels included in a third area 413 may be calculated to be +2.

As an example, the determination circuit 140 may determine whether to set a color on each of the pixels based on the non-zero winding rule. Here, the non-zero winding rule may refer to assigning color values to pixels of which winding numbers WN have a non-zero value. Referring to (b) of FIG. 12, according to the non-zero winding rule, the determination circuit 140 may set colors on pixels included in the second area 412 and the third area 413 shown in (a) of FIG. 12, and may not set colors on the pixels included in the first area 411.

As another example, the determination circuit 140 may determine whether to set a color on each of the pixels based on the even-odd rule. Here, the even-odd rule may refer to assigning color values to pixels of which winding numbers WN have odd values. Here, an odd value of a winding number WN of a pixel may refer to an odd absolute value of the winding number WN of the pixel. For example, in both cases in which the winding number WN of the pixel is +3 and −3, the winding number WN of the pixel may be determined to have an odd value. Referring to (c) of FIG. 12, according to the even-odd rule, the determination circuit 140 may set colors on the pixels included in the second area 412 shown in (a) of FIG. 12, and may not set colors on the pixels included in the first area 411 and the third area 413.

Figure 13:
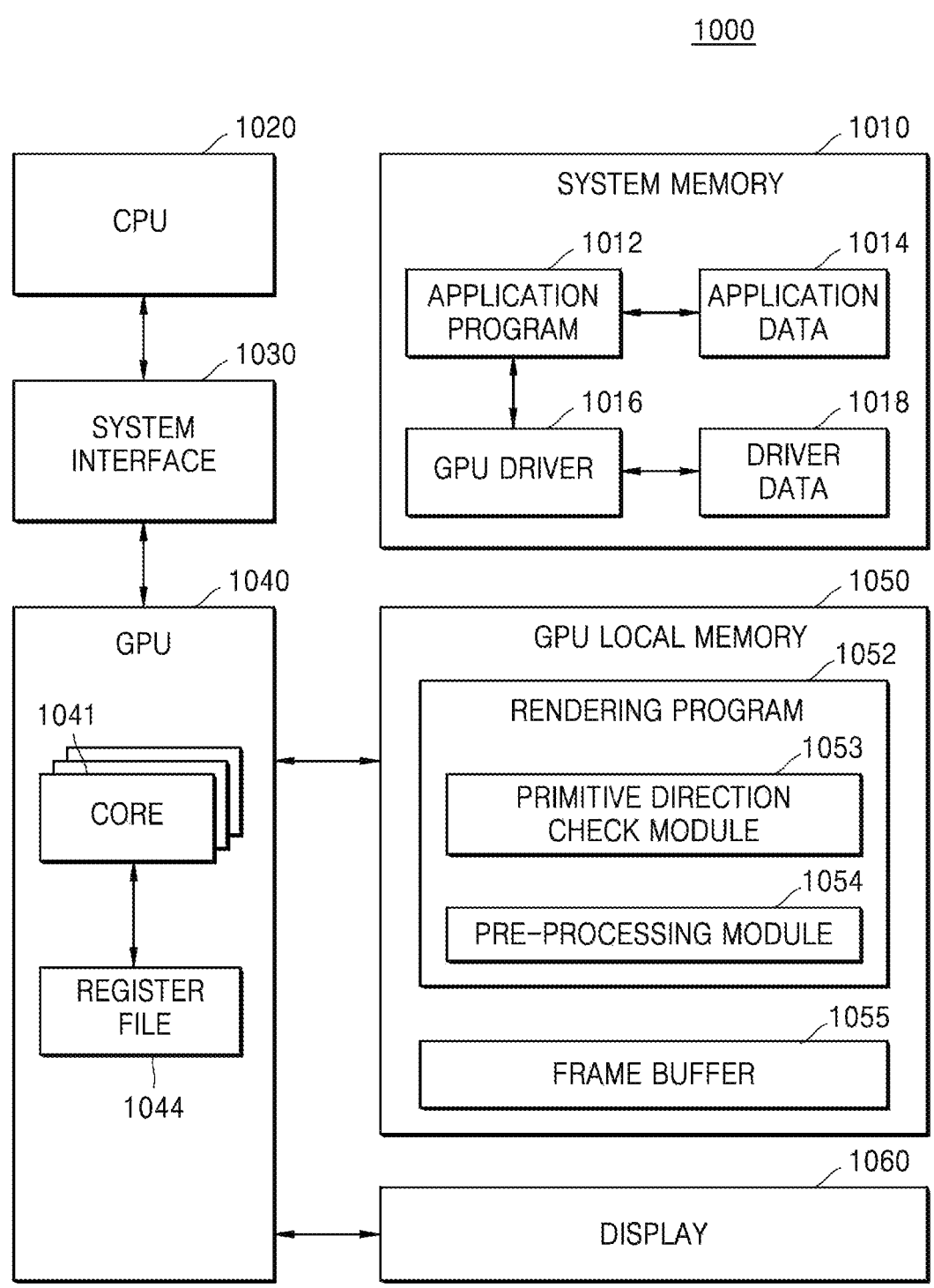
FIG. 13 is a block diagram of a computing device according to an exemplary embodiment.

FIG. 13 is a block diagram of a computing device 1000 according to an exemplary embodiment.

Referring to FIG. 13, the computing device 1000 may include a system memory 1010, a central processing unit (CPU) 1020, a system interface 1030, a graphics processing unit (GPU) 1040, a GPU local memory 1050, and a display 1060.

The CPU 1020 may execute a programming command stored in the system memory 1010, operate based on data stored in the system memory 1010, and communicate with the GPU 1040 via the system interface 1030 configured to bridge communication between the CPU 1020 and the GPU 1040. The CPU 1020, the GPU 1040, and the system interface 1030 may be integrated as a single processing unit. Also, some functions of the GPU 1040 may be included in another type of special-purpose processing unit or a chipset of a co-processor. The system memory 1010 may include DRAM, which may be directly connected to the CPU 1020 or alternately connected to the CPU 1020 through the system interface 1030. To render graphic data and images stored in the GPU local memory 1050, the GPU 1040 may receive path data transmitted by the CPU 1020 and process the path data. The GPU local memory 1050 may be implemented as any one of a memory of the GPU 1040, an on-chip memory, and a peer memory. The GPU 1040 may display a specific graphic image stored in the GPU local memory 1050 on the display 1060.

The system memory 1010 may include an application program 1012, application data 1014, a GPU driver 1016, and GPU driver data 1018. The application program 1012 may transmit at least one shading program to a graphics application programming interface (API) to process the at least one shading program in the GPU driver 1016. A high-level shading program may be typically a source code text of a high-level programming command that is designed to operate on at least one shader, and functions of the graphics API may be implemented in the GPU driver 1016.

The GPU local memory 1050 may include a rendering program 1052 and a frame buffer 1055. The frame buffer 1055 may include at least one two-dimensional (2D) surface used to drive the display 1060. Since the frame buffer 1055 includes at least one 2D surface, the GPU 1040 may perform a rendering operation using one 2D surface, and the rendering result may be used to drive the display 1060. According to an exemplary embodiment, the rendering program 1052 may include a primitive direction check module 1053 and a pre-processing module 1054. A term 'module' used herein may refer to software or a hardware component such as a field programmable gate array (FPGA) or an application specific integrated circuit (ASIC) and the 'module' may perform specific functions. When the 'module' refers to a hardware component, the primitive direction check module 1053 and the pre-processing module 1054 may be included in the GPU 1040. However, the 'module' is not limited to software or hardware. The 'module' may be included in an addressable storage medium or configured to reproduce at least one processor. Accordingly, in an example, the 'module' may include components (e.g., software components, object-oriented software components, class components, and task components), processes, functions, attributes, procedures, subroutines, segments of program code, drivers, firmware, microcode, circuitry, data, databases, data structures, tables, arrays, and variables. Functions provided in the components and 'modules' may be combined by reduced numbers of components and 'modules' or further separated into additional components and 'modules.'

The GPU 1040 may include a plurality of cores 1041 and a register file 1044. The register file 1044 may include a plurality of registers having a predetermined storage capacity. The cores 1041 may execute a rendering program 1052 and perform a rendering operation based on path data received from the CPU 1020. The cores 1041 according to an exemplary embodiment may generate primitive direction information included in a path of the path data based on the primitive direction check module 1053 and store the primitive direction information in the register file 1044. The cores 1041 may generate winding numbers of a plurality of pixels using the primitive direction information stored in the register file 1044 and perform a rendering operation using the winding numbers. The cores 1041 may perform operations of generating the winding numbers of the respective pixels in parallel by using a plurality of threads.

In addition, the cores 1041 may perform a pre-processing operation on path data based on the pre-processing module 1054 and generate primitive direction information appropriate for a configuration of the register file 1044 (e.g., a memory size of the registers). However, the inventive concept is not limited to the above-described example, and the pre-processing operation may be performed by the CPU 1020. In an exemplary embodiment, the CPU 1020 may pre-process the path data such that a predetermined path includes primitives in a number equal to or smaller than a maximum number of primitives of the path. The maximum number of primitives of the path may be set in advance, based on a storable bit number of the registers of the register file 1044. Thereafter, the CPU 1020 may provide the processed path data to the GPU 1040. A method of pre-processing the path data by using the CPU 1020 may be the same as or similar to that described with reference to FIGS. 9A and 9B.

Typical example exemplary embodiments of the inventive concept are disclosed in the above description and the drawings. Although specific terms are employed, they are used in a generic and descriptive sense only and not for purposes of limitation. It will be understood by those of ordinary skill in the art that various changes in form and details may be made to the disclosed exemplary embodiments without departing from the spirit and scope of the inventive concept as defined by the following claims.

What is claimed is:

1. An apparatus configured to render an object comprising a path, the apparatus comprising:
   a storage circuit;
   an arithmetic circuit configured to:
      determine directions of a plurality of primitives in the path, based on path data,
      generate primitive direction information,
      control to store the primitive direction information in the storage circuit, and
      generate a winding number of each of a plurality of pixels using the stored primitive direction information; and
   a determination circuit configured to determine whether a shading operation is to be performed based on the generated winding number,
   wherein, when a number of plurality of primitives in the path exceeds a storable bit number of a storage area of the storage circuit, the arithmetic circuit is further configured to perform a pre-processing operation on the path data to adjust the number of plurality of primitives to the storable bit number of the storage area or to less than the storable bit number of the storage area.

2. The apparatus of claim 1, wherein the arithmetic circuit is further configured to:
   generate a primitive mask of each of the plurality of pixels based on whether an imaginary line extending from each of the plurality of pixels in a first direction intersects with at least one of the plurality of primitives,
   perform an arithmetic operation using the generated primitive mask and the stored primitive direction information, and
   generate the winding number of each of the plurality of pixels.

3. The apparatus of claim 2, wherein the arithmetic circuit is further configured to determine whether the plurality of primitives have a second direction or a third direction, and
   wherein the first direction is perpendicular to each of the second direction and the third direction.

4. The apparatus of claim 1, wherein the arithmetic circuit is further configured to perform operations of generating winding numbers of the respective ones of the plurality of pixels in parallel.

5. The apparatus of claim 1, wherein the storage circuit comprises at least one storage area configured to store N-bit information, wherein N is an integer equal to or more than 1, and
   the arithmetic circuit is further configured to store the primitive direction information in bit areas of the storage area corresponding to each of the plurality of primitives.

6. The apparatus of claim 1, wherein the pre-processing operation comprises:
   dividing the path into at least two sub-paths, and
   generating the primitive direction information for each of the at least two sub-paths.

7. The apparatus of claim 1, wherein the pre-processing operation comprises:
   dividing a tile corresponding to the path data when the apparatus renders the object comprising the path using a tile-based rendering method.

8. The apparatus of claim 1, wherein the storage circuit comprises at least one from among a plurality of registers, a plurality of flip-flops, and a plurality of special registers having multi-ports, which respectively corresponds to a plurality of storage areas used to generate the winding number.

9. The apparatus of claim 1, wherein the path data comprises information about a color assignment rule based on the winding number, and
   wherein the determination circuit is further configured to perform a shading operation based on the winding number and the color assignment rule.

10. The apparatus of claim 1, wherein, when the generating of the winding number is completed based on the path data, the arithmetic circuit is further configured to control to delete the primitive direction information stored in the storage circuit to generate a winding number for next path data.

11. A method of rendering an object comprising a path using a graphics processing apparatus, the method comprising:
    obtaining path data comprising information on vertexes in the path and a command corresponding to the path;
    generating primitive direction information indicating a direction of a plurality of primitives in the path, based on the path data;
    performing a pre-processing operation on the path data to adjust a number of plurality of primitives to a storable bit number of a storage area or to less than the storable bit number of the storage area based on the number of plurality of primitives in the path exceeding the storable bit number of the storage area;
    generating a winding number of each of a plurality of pixels using the primitive direction information; and
    determining whether a shading operation is to be performed based on the winding number.

12. The method of claim 11, wherein the generating of the primitive direction information comprises:
    first determine whether the plurality of primitives have a first direction;
    generating first data information based on a result of the first determining;
    second determining whether the plurality of primitives have a second direction opposite the first direction; and
    generating second data information based on a result of the second determining.

13. The method of claim 12, wherein the generating of the winding number comprises:
    generating a primitive mask of each of the plurality of pixels depending on whether an imaginary line extending from each of the plurality of pixels in a third direction intersects with at least one of the plurality of primitives; and
    performing an arithmetic operation using the primitive mask, the first data information, and the second data information to generate the winding number.

14. The method of claim 13, wherein the third direction is perpendicular to each of the first direction and the second direction.

15. The method of claim 13, wherein the primitive mask, the first data information, and the second data information have a bit number corresponding to the number of plurality of primitives,
    wherein the performing of the arithmetic operation using the primitive mask, the first data information, and the second data information comprises:
        performing a first comparison operation between bits corresponding to the primitive mask and bits corresponding to the first data information;
        performing a second comparison operation between bits corresponding to the primitive mask and bits corresponding to the second data information; and
        generating the winding number using a result of the first comparison operation and a result of the second comparison operation.

16. The method of claim 11, wherein the graphics processing apparatus includes a storage circuit used to perform an arithmetic operation for generating the winding number, and
    wherein the generating of the primitive direction information comprises storing the primitive direction information in a predetermined storage area of the storage circuit.

17. The method of claim 11, wherein the graphics processing apparatus includes a storage circuit comprising an N-bit storage area configured to store the primitive direction information, wherein N is an integer equal to or more than 1, and
    wherein the path data is pre-processed such that the number of plurality of primitives in the path corresponding to the path data is N or less.

18. The method of claim 11, wherein the graphics processing apparatus comprises a storage circuit comprising the storage area configured to store the primitive direction information,
    wherein the storage area is an N-bit storage area, and
    wherein the method further comprises:
        determining whether the number of plurality of primitives in the path exceeds N; and
        performing the pre-processing operation on the path data to adjust the number of plurality of primitives to N or less based on a result of the determining whether the number of plurality of primitives in the path exceeds N.

19. A computing device comprising:
    a central processing unit (CPU) configured to generate path data corresponding to a path in a frame;
    a graphics processing unit (GPU) configured to receive the path data and perform a rendering operation based on the path data; and
    a GPU local memory configured to store a rendering program, wherein the rendering operation is performed by the GPU based on the rendering program,
    herein the GPU comprises a register file comprising a plurality of registers, and
    wherein the GPU is further configured to:
        determines a direction of a plurality of primitives in the path based on the path data,
        generate primitive direction information,
        control to store the primitive direction information in the register file, and
        generate a winding number of each of a plurality of pixels using the stored primitive direction information, and
    wherein, when a number of plurality of primitives in the path exceeds a storable bit number of the register file, the GPU is further configured to perform a pre-processing operation on the path data to adjust the number of plurality of primitives to the storable bit number of the register file or to less than the storable bit number of the register file.

* * * * *